3,008,642
VEHICLE HEATING APPARATUS
Siegfried Kofink and Ewald Schubert, Esslingen (Neckar), and Max Münzenmaier, Wernau (Neckar), Germany, assignors to J. Eberspacher, Esslingen (Neckar), Germany, a firm of Germany
Filed July 23, 1959, Ser. No. 829,117
Claims priority, application Germany July 26, 1958
5 Claims. (Cl. 237—12.3)

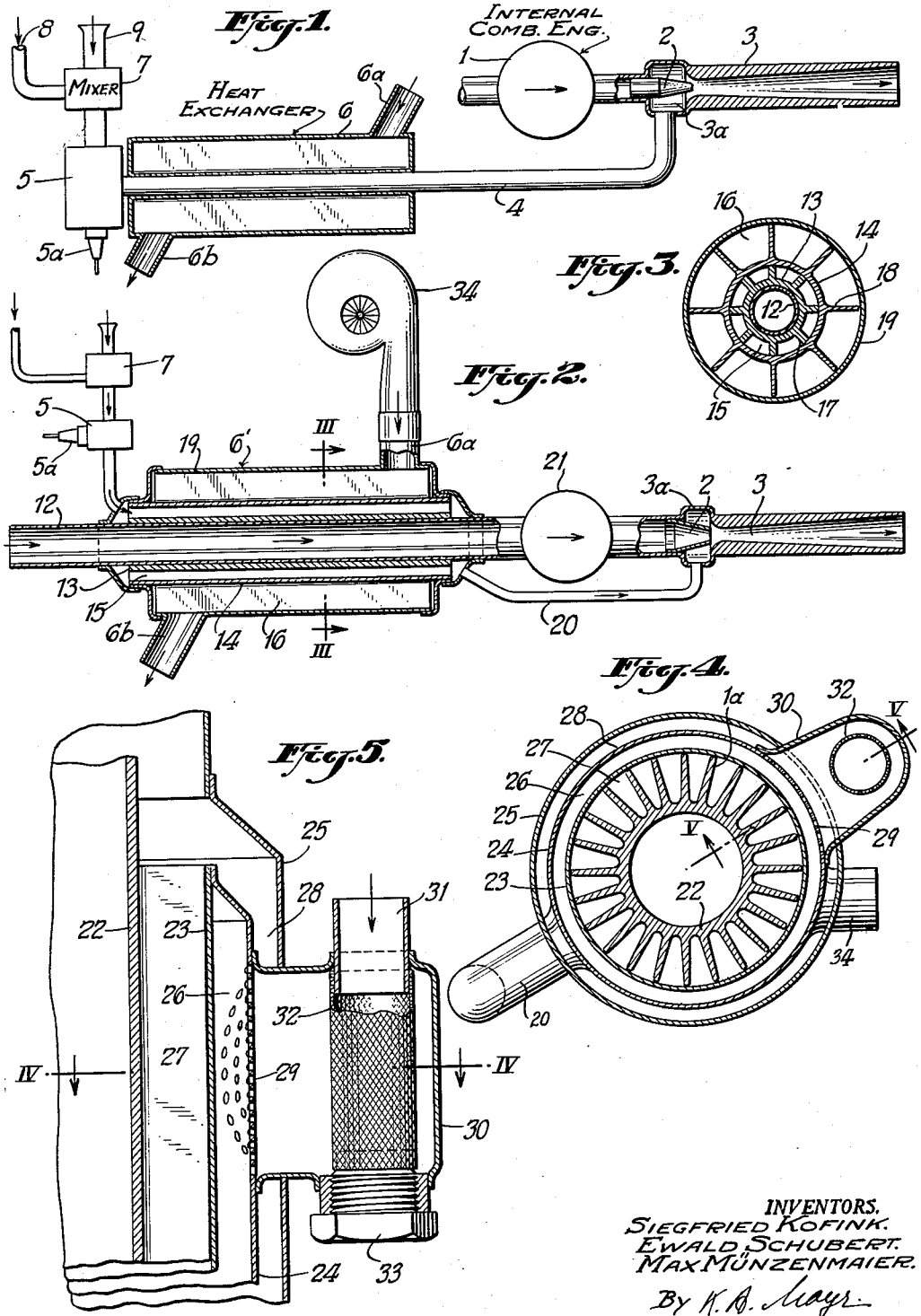

The present invention relates to a heating device in which a mixture of liquid or gaseous fuel and air is continuously supplied to a combustion apparatus.

In conventional heating devices of this type the combustion air and the fuel are separately supplied to a combustion chamber in which they are mixed. The combustion air is usually supplied by means of a blower driven by an electric motor.

It is an object of the invention to provide a heating device whose structure is simple and which has no moving parts and which is particularly suitable for heating motor vehicles. In the heating device according to the invention the combustion air or a mixture of fuel and combustion air is continuously drawn into a combustion apparatus by means of an ejector which is preferably operated by the exhaust gas of the engine of the motor vehicle. In a preferred embodiment of the invention the ejector draws combustion air through a mixing device in which the combustion air is mixed with fuel and draws the mixture into a combustion chamber in which the mixture is ignited. The resulting hot combustion gas flows as the heating medium through an indirect heat exchanger and therefrom to the ejector. Supply means for the fuel, for example a pump, may be driven by the internal combustion engine which supplies the operating gas to the ejector.

Heating devices for motor vehicles are known in which the exhaust of the internal combustion engine driving the vehicle is passed through the heat exchanger and is supplementally heated by burning fuel. Air or water is heated in the heat exchanger. A disadvantage of these heating devices is that the exhaust gas of the engine is mixed with the gases produced by the burning fuel whereby the efficiency of the heating device is considerably reduced.

The invention provides a heating device in which exhaust gas of an internal combustion engine and gas produced by combustion of additional fuel are separately conducted through the heat exchanger so that the latter can be selectively heated by the exhaust gas or by the separately produced combustion gas or by both.

In the heating device according to the invention two preferably coaxial annular chambers, one within the other, are arranged around a portion of the exhaust pipe of the internal combustion engine. The heat carrier which must be heated, is conducted through one of the chambers and the additional combustion gas is conducted through the other of the chambers.

If the additional combustion gas is conducted through the annular chamber which is adjacent to the exhaust pipe, this chamber serves to prevent entry of exhaust gas into the outer annular chamber through which the heating air is conducted, in case of leakage of the exhaust pipe.

Heat conducting means such as ribs are preferably provided in the annular chambers to improve heat transfer from the heating gases to the heat carrier.

The burner for the additional fuel is preferably annular and coaxially arranged upstream of the annular chamber conducting the supplemental heating gas which chamber is adjacent to the exhaust pipe. A conduit connects the outlet of the annular chamber conducting the supplemental heating gas with the ejector which is interposed in the exhaust gas pipe. In this way a relatively low pressure is produced in the annular chamber which is adjacent to the exhaust pipe so that leakage of exhaust gas into the outer annular chamber wherein flows the heating air is prevented. The subatmospheric pressure in the inner annular chamber draws the additional fuel-air mixture through the combustion chamber which is, at least partly, formed by the inner annular chamber. The ejector may be replaced by a blower so that the heating device can be operated independently of the internal combustion engine.

The fuel supply to the heating device according to the invention may be controlled by a solenoid-actuated valve in the conventional manner. For controlling and limiting the heating effect of the device a throttle flap or a controllable nozzle system may be provided in the fuel-air mixing device.

If the temperature and composition of the additional combustion gas is so as to damage the structural material of the heat exchanger, copper shielding or the like may be provided and/or excess combustion air may be supplied to the combustion apparatus for the additional fuel.

If the surface of the heat exchanger which is exposed to the hot combustion gases is made of a material having a relatively low melting point, for example of aluminum, at least a part of the surface may be protected by high heat-resistant steel or the combustion gases may be diverted from the surface to prevent excessive local heating.

Since in the devices with which the invention is concerned the greater part of the combustion process takes place in a relatively small space and, particularly, if this space has an annular cross section, combustion is incomplete or inefficient. If there are no special precautionary means, the flame may reach back into the mixer and cause explosions. It is an object of the present invention to provide means improving the fuel-air mixing process and preventing premature ignition of the mixture by arranging an intermediate chamber between the mixer and the combustion chamber and interposing a perforated and/or strainerlike element between the intermediate chamber and the combustion chamber. A similar element may be interposed in the flow of the fuel-air mixture between the mixer and the intermediate chamber which element may be placed within the intermediate chamber. These elements produce a more homogenous mixture and a uniform distribution of the fuel in the combustion air. The intermediate chamber is preferably placed laterally of the annular combustion chamber whereby the perforated element between the intermediate chamber and the combustion chamber forms part of the outer wall of the combustion chamber. The strainerlike element is preferably in the form of a tube extending parallel to the annular combustion chamber and the intermediate chamber has a semicylindrical wall portion which is coaxial of the strainer tube.

The novel features which are considered characteristic of the invention are set forth with particularity in the appended claims. The invention itself, however, and additional objects and advantages thereof will best be understood from the following description of embodiments thereof when read in connection with the accompanying drawings, in which:

FIG. 1 is a diagrammatic longitudinal part sectional view of a heating device according to the invention.

FIG. 2 is a diagrammatic longitudinal part sectional view of a modified heating device according to the invention.

FIG. 3 is a cross sectional view of the heat exchanger forming part of the device shown in FIG. 2, the section being made along line III—III of FIG. 2.

FIG. 4 is a cross sectional view of another modification of a heating device according to the invention.

FIG. 5 is a longitudinal sectional view, along line V—V of FIG. 4, of an intermediate chamber forming part of the device shown in FIG. 4. A section along line IV—IV of this intermediate chamber is shown in FIG. 4.

Referring more particularly to FIG. 1 of the drawing, numeral 7 designates a mixer for mixing fuel supplied through a conduit 8 and air supplied to the mixer through an inlet 9. The fuel-air mixture prepared in the device 7 flows into a burner or combustion chamber 5 in which the mixture is ignited by a spark plug 5a or other suitable igniting means. The burning gases and products of combustion are conducted through a heat exchanger 6 in which heat is transferred to a heat carrier, for example air, which enters the heat exchanger through an inlet 6a, the heated air leaving the heat exchanger through an outlet 6b to be conducted to the space which is desired to be heated. An outlet conduit 4 is connected to the heat exchanger 6 for conducting the combustion gases, after they have given up heat to the heat carrier fluid passing through the heat exchanger, to a suction chamber 3a in which a relatively low pressure is produced by an ejector 3 having a nozzle 2 supplied with exhaust gas of relatively high pressure from an internal combustion engine 1. The suction produced by the ejector 3 extends through the outlet conduit 4 and the combustion chamber 5 into the mixer 7 and draws combustion air into the latter through the inlet 9.

FIG. 2 illustrates a modified arrangement of a heating device according to the invention, having a fuel-air mixer 7 supplying a burner 5 provided with a spark plug 5a for starting combustion. Numeral 12 designates an exhaust pipe of an internal combustion engine, not shown, and having a portion provided with a protecting tube 13 and extending through a heat exchanger 6'. A tube 14 coaxially surrounds the tube 13, providing a space 15 between the tubes 13 and 14. This space acts as a precaution against leakage of gas from the exhaust pipe 12 into a space 16 in which air is heated. The outside of the tube 13 is provided with ribs 17 facilitating heat exchange between the tubes 13 and 14. The outside of the tube 14 is provided with ribs 18 facilitating heat flow from the tube 14 to the air flowing through the space 16. The latter is confined in a tube 19 receiving air to be heated through an inlet 6a and discharging the heated air through an outlet 6b wherefrom the heated air flows, for example, into the passenger compartment of the motor vehicle. A blower 34 may be provided for blowing the air to be heated into the inlet 6a. An outlet pipe 20 connects the annular space 15 and the suction chamber 3a of an ejector 3 whose nozzle 2 is connected to the end of the exhaust pipe 12. A muffler 21 is interposed in the exhaust pipe 12 between the heat exchanger 6' and the nozzle 2.

The exhaust gas passing through the ejector 3 produces a suction in the conduit 20 and in the annular chamber 15 wherefrom combustion air is drawn into the burner 5 wherefrom the fuel-air mixture is drawn into the burner 5. The burning mixture passes through the annular chamber 15. The suction produced by the ejector 3 is effective also when no fuel is supplied to the mixer 7 and/or when there is no ignition in the burner 5 so that no undesired gas or fumes enter the space 16, if there is any leakage in the exhaust pipe or any irregularity in the operation of the combustion apparatus FIG. 4 shows a heating device in which an exhaust pipe 22 of an internal combustion engine is surrounded by coaxial tubes 23, 24 and 25, the annular space 26 between the tubes 23 and 24 forming a combustion chamber of the supplemental heating apparatus. The combustion chamber 26 surrounds an annular space 27 and is surrounded by an annular space 28. The air to be heated is conducted through the spaces 27 and 28 and is supplied thereto and relieved therefrom in the same manner as in FIG. 2. The fuel-air mixture to be burned in the space 26 is introduced thereinto through a perforated screen 29 from an intermediate chamber 30. A mixture of fuel and air is supplied to the chamber 30 through a pipe 31 (FIG. 5) from a mixer, not shown. The pipe 31 terminates in a tubular strainer 32 which is placed inside the chamber 30 and whose far end is secured to the wall of the chamber 30 by means of a nut 33. The tubular strainer improves distribution of the fuel-air mixture supplied by the pipe 31 before the mixture enters the chamber 30. The perforated plate 29 makes the mixture entering the combustion chamber 26 still more homogeneous. The relatively large straining area of the cylindrical element 32 which is preferably parallel to the pipe 22 and partly surrounded by a coaxial semicircular portion of the wall of the chamber 30 effects improved distribution of the fuel in the air and of the improved mixture in the chamber 30. The mixture is ignited in the space 26 by conventional means, for example a spark plug, mounted in a boss 34. Backing up of the flame from the combustion chamber 26 into the chamber 30 is impeded by the screen 29 and farther backing up of the flame into the pipe 31 and the fuel-air mixer is impeded by the strainer element 32 so that not only is the combustion process improved but also is the device made safe against explosions in the fuel-air mixing apparatus.

We claim:

1. In combination with an internal combustion engine, a combustion chamber, fuel and combustion air supply means and igniting means connected to said combustion chamber, an indirect heat exchanger operatively connected to said combustion chamber, an exhaust gas pipe for conducting exhaust gas from the internal combustion engine and extending through and beyond said heat exchanger, the latter including tubular elements coaxially surrounding said exhaust gas pipe and forming at least two annular chambers, one of said annular chambers being connected to said combustion chamber for conducting hot combustion gas exclusively through the heat exchanger and separate from the engine exhaust gas, and means connected to at least a second of said annular chambers for conducting a fluid to be heated through said second annular chamber.

2. In combination with an internal combustion engine, an indirect heat exchanger, an exhaust gas pipe for conducting exhaust gas from the internal combustion engine and extending through and beyond said heat exchanger, the latter including tubular elements coaxially surrounding said exhaust gas pipe and forming at least two annular chambers, fuel and combustion air supply means and igniting means connected to one of said chambers for producing a hot gas in one of said chambers by combustion of the fuel, and means connected to at least a second of said annular chambers for conducting a fluid to be heated through the second annular chamber, said exhaust gas pipe, said first annular chamber, and said second annular chamber forming separate conduits for the egnine exhaust gas, for the combustion gas, and for the fluid to be heated.

3. In the combination defined in claim 2 and wherein said fuel and combustion air supply means includes a tubular strainer, a fuel and air mixture supply pipe axially connected to said strainer for conducting the fuel and air mixture to the inside of said strainer, and a chamber surrounding and having walls radially spaced from said strainer for receiving the fuel and air mixture leaving said strainer in substantially radial direction.

4. In the combination defined in claim 3 and wherein said chamber surrounding said strainer is laterally connected to that one of said annular chambers wherein the fuel is burned.

5. In the combination according to claim 3 and wherein the longitudinal axis of said tubular strainer is substantially parallel to the longitudinal axis of said annular chambers.

References Cited in the file of this patent

UNITED STATES PATENTS

| | | |
|---|---|---|
| 135,011 | Rogers | Jan. 21, 1873 |
| 593,516 | Crockford | Nov. 9, 1897 |
| 1,947,716 | Hyatt | Feb. 20, 1934 |
| 2,285,672 | McCollum | June 9, 1942 |
| 2,332,094 | McCollum | Oct. 19, 1943 |
| 2,374,203 | Holthouse | Apr. 24, 1945 |

FOREIGN PATENTS

| | | |
|---|---|---|
| L18679II/63C | Germany | Oct. 31, 1956 |